June 14, 1949.  W. H. HOPPMANN  2,472,829
PEAK ACCELEROMETER
Filed Aug. 11, 1945

INVENTOR.
William H. Hoppman
BY
Ralph L. Chappell
ATTORNEY

Patented June 14, 1949

2,472,829

UNITED STATES PATENT OFFICE 2,472,829

PEAK ACCELEROMETER

William H. Hoppmann, Valley Stream, N. Y.

Application August 11, 1945, Serial No. 610,387

8 Claims. (Cl. 264—1)

(Granted under the act of March 3, 1883, as amended April 30, 1928; 370 O. G. 757)

This invention relates to the art of peak accelerometers, and it is embodied in a device that is attachable to an impact testing machine, or to other equipment subject to mechanical shock, to determine the degree of acceleration to which the machine or equipment is subjected.

A complete study of the characteristics and effects of shock, such as that due to explosion or similar high-velocity impact, would involve a study of many variable characteristics, including, among others, peak acceleration, peak displacement, displacement as a function of time and acceleration as a function of time.

It is an object of this invention to provide a device for determining the maximum or peak acceleration attained by an object subjected to shock.

A further object is to provide a device for indicating when the peak acceleration attained by an object has exceeded a known value.

Figure 1:
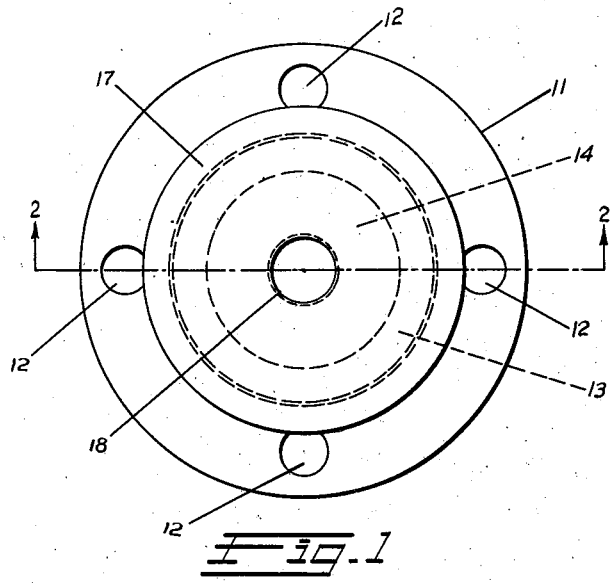
Figure 2:
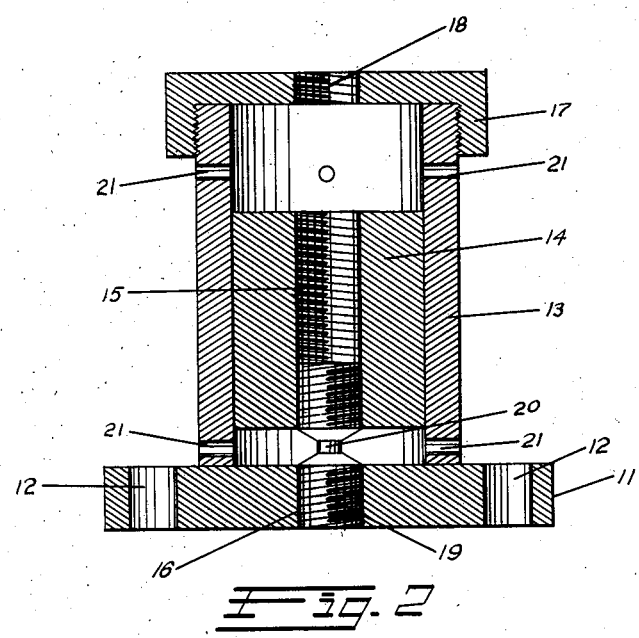

Further objects and advantages of this invention, as well as its construction, arrangement and operation, will be apparent from the following description and claims in connection with the accompanying drawings, in which, Fig. 1 is a plan view of the device of the present invention, and Fig. 2 is a cross-sectional elevation taken along the line 2—2 of Fig. 1.

The peak device of the disclosed embodiment comprises a base 11 having a plurality of holes 12 drilled therethrough, by means of which the base 11 may be bolted to a testing machine (not shown), or to any other piece of equipment to be subjected to shock. Welded or otherwise affixed to the base 11 is a guide 13 in the form of a cylinder. An inertia mass 14 fits slidably within the guide 13, and is provided with an axial bore 15, internally threaded at both ends. An internally threaded bore 16, co-axial with bore 15, is provided in base 11.

A cap 17 may be attached to the end of cylindrical guide 13 opposite base 11, in the manner shown for example. The cap 17 is provided with a threaded bore 18 that is also co-axial with the bore 15. A plurality of vent holes 21 are provided in cylindrical guide 13 near base 11, and also near the cap 17. The vents 21 permit air flow into and out of the cylinder of the guide 13, and permit movement of the inertia mass 14 without being effected by back pressure of air trapped in the cylinder of guide 13.

Gage specimens 19 are provided for use with the instrument of the present invention, and these are made of material having predetermined tensile strength. The gage specimens 19 are plugs that are notched at 20 about midway between their ends. The diameter at the base of the notch 20 is made to cause rupture when the gage specimen is subjected to a predetermined tensile load. At their opposite ends the plugs 19 are threaded to fit the threading of bores 15, 16 and 18, which are constructed uniformly for the purpose, and provide screw threaded attachments for the opposite ends of the plug 19.

The device is utilized in the following manner. Base 11 is bolted tightly to a testing machine, or to any structure that is to be subjected to shock, the magnitude of which is desired to be determined. A plug 19 is selected having a diameter at base of notch 20 that will cause rupture when subjected to a known tensile shock load, and is positioned in the device with one end thereof screwed into the bore 15 of weight 14, and the other end thereof screwed into either the bore 16 of base 11, or the bore 18 of cap 17, depending upon which direction the shock is expected to be applied.

Plug 19 may be made of suitable phenol-formaldehyde condensation product, or of a metal such as aluminum, or of other materials, its desirable characteristics being homogeneity and brittleness, that is, a tendency to fail in tension without appreciable deformation. A number of plugs 19 may be manufactured to identical specifications, especially as to the diameter of the necks 20, and the acceleration necessary to cause failure of the plugs in tension may be determined by determining the static tensile strength of some of the specimens.

Inertia mass 14, except for the restraint imposed by plug 19, is a free mass and as such will resist any accelerations to which the accelerometer is subjected. The acceleration necessary to rupture plug 19 at neck 20 may be determined from the fundamental relationship that force is equal to the product of mass and acceleration. The force necessary to rupture neck 20 having been determined in static tensile tests on similar specimens, and the free mass being considered as the sum of the mass of inertia mass 14 plus one half the mass of plug 19, the acceleration necessary to rupture plug 19 in tension can be simply calculated.

Plugs 19 being designed to fail in tension, the device is arranged as illustrated in Fig. 2 for determining peak accelerations in a direction toward base 11, that is with plug 19 attached at its opposite ends to the inertia mass 14 and the base 11. For determination of peak accelerations in the opposite direction the plug 19 is attached at its opposite ends to the inertia mass 14 and the cap 17.

When the structure to which the accelerometer is bolted is subjected to shock such as that caused by detonation or high-velocity impact, the rupture or the failure to rupture of neck 20 will denote whether or not the acceleration calculated as above described has been attained or exceeded.

Because the guide 13 is a cylinder, it prevents motion of the inertia mass 14 in a lateral direction relative to that in which the acceleration is being measured. Vent holes 21 allow free access of air between the chambers contained within cylindrical guide 13 on both sides of inertia mass 14 and the outside atmosphere, so that air cushioning within cylindrical guide 13 is substantially obviated. It has been determined that high-value accelerations occurring as the result of explosion or high-velocity impact are oscillatory in character, exhibiting frequencies of the order of several thousand cycles per second. Since the peak acceleration imposed upon the device may be of extremely short duration in point of time, it is highly desirable that the plug 19 be brittle, as more ductile materials might fail to be ruptured by peak accelerations of short duration. In measuring peak accelerations of comparatively great duration in point of time, materials of greater ductility may be employed.

The use of a new plug 19 has been found desirable after each test, regardless of whether rupture occurs or not, since all known materials exhibit at least some slight tendency to deform under stress, which, if disregarded, might affect consistency of results. Also, because complete homogeneity of the material used in plug 19 cannot be attained, it is deemed desirable to base conclusions on the results attained with not less than three specimens.

The accelerations that can be measured with the instrument of the present invention will vary with the tensile strength of the material used in plug 19, the diameter of neck 20 and the weight of inertia mass 14. Since with the use of any material in plug 19 there is a lower limit to the diameter of neck 20 that is feasible, due to difficulties of machining or due to growing errors which may be introduced because of possible non-homogeneity, the range of accelerations that can be measured can be extended most readily by using materials of varying density for the inertia mass 14, or by changing the size thereof. For example, extension of the range to higher acceleration values can be accomplished by the use of lighter materials in inertia mass 14 or by reducing the size thereof. The use of an aluminum inertia mass 14 in place of steel would extend the range to a value roughly 2½ or 3 times its previous maximum.

The device has the advantages of extreme simplicity and ease of use, but it will be seen that the information obtained as the result of any one test is limited to an indication that the peak acceleration attained either exceeded or was less than a predetermined value corresponding to the plug-inertia mass combination employed. For a more absolute determination of the peak acceleration attained a plurality of the peak accelerometers may be employed, each having a plug-inertia mass combination corresponding to a different acceleration value, thereby covering any desired range in increments of any desired size.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An instrument for determining acceleration by rupture of a gage specimen and consisting of a guide, a weight movable in a path determined by the guide and having a magnitude of mass that is predetermined with reference to anticipated impact for rupturing the specimen under impact of predetermined magnitude, an attachment for attaching one end of the gage specimen to the weight, an attachment for the other end of the gage specimen to a fixed portion of the instrument.

2. An instrument for determining acceleration by rupture of a gage specimen and consisting of a cylindrical guide, a weight movable in the cylindrical guide, and having a magnitude of mass that is predetermined with reference to anticipated impact for rupturing the specimen under impact of predetermined magnitude, an attachment for attaching one end of the gage specimen to the weight, and attachment for the other end of the gage specimen to a fixed portion of the instrument.

3. An instrument for determining acceleration by rupture of a gage specimen and consisting of a base comprising means to attach it to a structure that may be subjected to shock, a cylindrical guide fixed to and extending away from the base, a weight movable in the cylindrical guide, and having a magnitude of mass that is predetermined with reference to anticipated impact for rupturing the specimen under impact of predetermined magnitude, an attachment for attaching one end of the gage specimen to the weight, an attachment for the other end of the gage specimen to the base.

4. In an instrument as defined in claim 3, a cover for the end of the cylinder opposite the base, the cover comprising an alternative attachment for the end of the gage specimen opposite the one attached to the weight.

5. In an instrument as defined in claim 3, vents in the wall of the cylindrical guide near the base.

6. In an instrument for determining shock acceleration to which a structure is subjected, a guide and means for attaching the guide to the structure projecting away therefrom, a weight movable in a path determined by the guide and having a magnitude of mass that is predetermined with reference to anticipated impact for rupturing the specimen under impact of a predetermined magnitude, a gage specimen of predetermined tensile strength, an attachment for attaching one end of the gage specimen to the weight, an attachment for the other end of the gage specimen to a fixed portion of the instrument.

7. In an instrument for determining shock acceleration to which a structure is subjected, a guide in the form of a cylinder, a weight of predetermined mass in the form of a piston movable in the cylinder, a base plate for the instrument closing one end of the cylinder, a screw-threaded attachment embodied in the plate coaxial with the cylinder, a like screw-threaded attachment embodied in the weight coaxial with the attachment of the base plate, a gage specimen of predetermined tensile strength and comprising screw threads at its opposite ends companion to the threads of the attachments.

8. A gage specimen for peak accelerometers comprising a plug of inelastic material with a predetermined tensile strength, a circumferential notch in the plug positioned intermediate its ends, the cross-sectional area of the plug at the base of the notch being predetermined for rupture when subjected to a predetermined shock load, attaching means at opposite ends of the plug.

WILLIAM H. HOPPMANN.

REFERENCES CITED

The following references are of record in the file of this patent:

UNITED STATES PATENTS

| Number | Name | Date |
|---|---|---|
| 1,985,478 | Yuasa | Dec. 25, 1934 |
| 2,093,414 | Burgan | Sept. 21, 1937 |
| 2,237,326 | Barry | Apr. 8, 1941 |
| 2,292,549 | Simmons | Aug. 11, 1942 |
| 2,332,994 | Draper | Oct. 26, 1943 |
| 2,375,032 | Parke | May 1, 1945 |
| 2,377,212 | Cottrell | May 29, 1945 |